United States Patent
Sabadie et al.

(10) Patent No.: US 8,925,866 B2
(45) Date of Patent: Jan. 6, 2015

(54) DEVICE FOR FASTENING SYSTEMS FOR AN AIRCRAFT, ADAPTED IN PARTICULAR TO BE USED IN RELATION TO A WINDOW

(75) Inventors: Lionel Sabadie, Toulouse (FR); Romain Durand, Aussonne (FR); Marc Tomasi, Toulouse (FR); Jean-Claude Briois, Plaisance du Touch (FR)

(73) Assignee: AIRBUS Operations S.A.S., Toulouse (FR)

( * ) Notice: Subject to any disclaimer, the term of this patent is extended or adjusted under 35 U.S.C. 154(b) by 6 days.

(21) Appl. No.: 13/165,150

(22) Filed: Jun. 21, 2011

(65) Prior Publication Data
US 2012/0001025 A1     Jan. 5, 2012

(30) Foreign Application Priority Data
Jun. 22, 2010   (FR) ...................... 10 02609

(51) Int. Cl.
*B64C 1/14*   (2006.01)
*B64C 1/06*   (2006.01)
*B64C 1/40*   (2006.01)

(52) U.S. Cl.
CPC ............... *B64C 1/066* (2013.01); *B64C 1/1484* (2013.01); *B64C 1/406* (2013.01); *Y02T 50/46* (2013.01)
USPC ...................................... 244/129.3

(58) Field of Classification Search
CPC .... B64C 1/1476; B64C 1/1484; B64C 1/1492
USPC .......... 244/129.3, 118.1; 248/208, 58, 59, 64, 248/68.1, 74.3, 72, 311.2, 312, 214
See application file for complete search history.

(56) References Cited

U.S. PATENT DOCUMENTS

| | | | |
|---|---|---|---|
| 4,541,595 A * | 9/1985 | Fiala et al. .................. | 244/129.3 |
| 5,730,399 A | 3/1998 | Baginski | |
| 7,905,452 B2 * | 3/2011 | Bold .......................... | 244/129.3 |
| 2005/0082431 A1 | 4/2005 | Scown et al. | |
| 2007/0075187 A1 * | 4/2007 | Bold .......................... | 244/129.3 |
| 2008/0265112 A1 | 10/2008 | Pascual et al. | |
| 2010/0127128 A1 | 5/2010 | Giavarini | |

FOREIGN PATENT DOCUMENTS

FR          2 912 804        8/2008
WO    WO 2009/124832 A2    10/2009

OTHER PUBLICATIONS

French Preliminary Search Report issued on Feb. 24, 2011 in corresponding French Application No. 10 02609 filed on Jun. 22, 2010 (with an English Translation of Categories).

* cited by examiner

*Primary Examiner* — Brian M O'Hara
(74) *Attorney, Agent, or Firm* — Oblon, Spivak, McClelland, Maier & Neustadt, L.L.P.

(57) ABSTRACT

The invention relates to a device for fastening systems in an aircraft.
It comprises on the one hand a ring-shaped base (2) and on the other hand arms (4, 6) borne by the ring-shaped base (2), extending outward from the latter and bearing systems supports.

10 Claims, 9 Drawing Sheets

Figure 1:
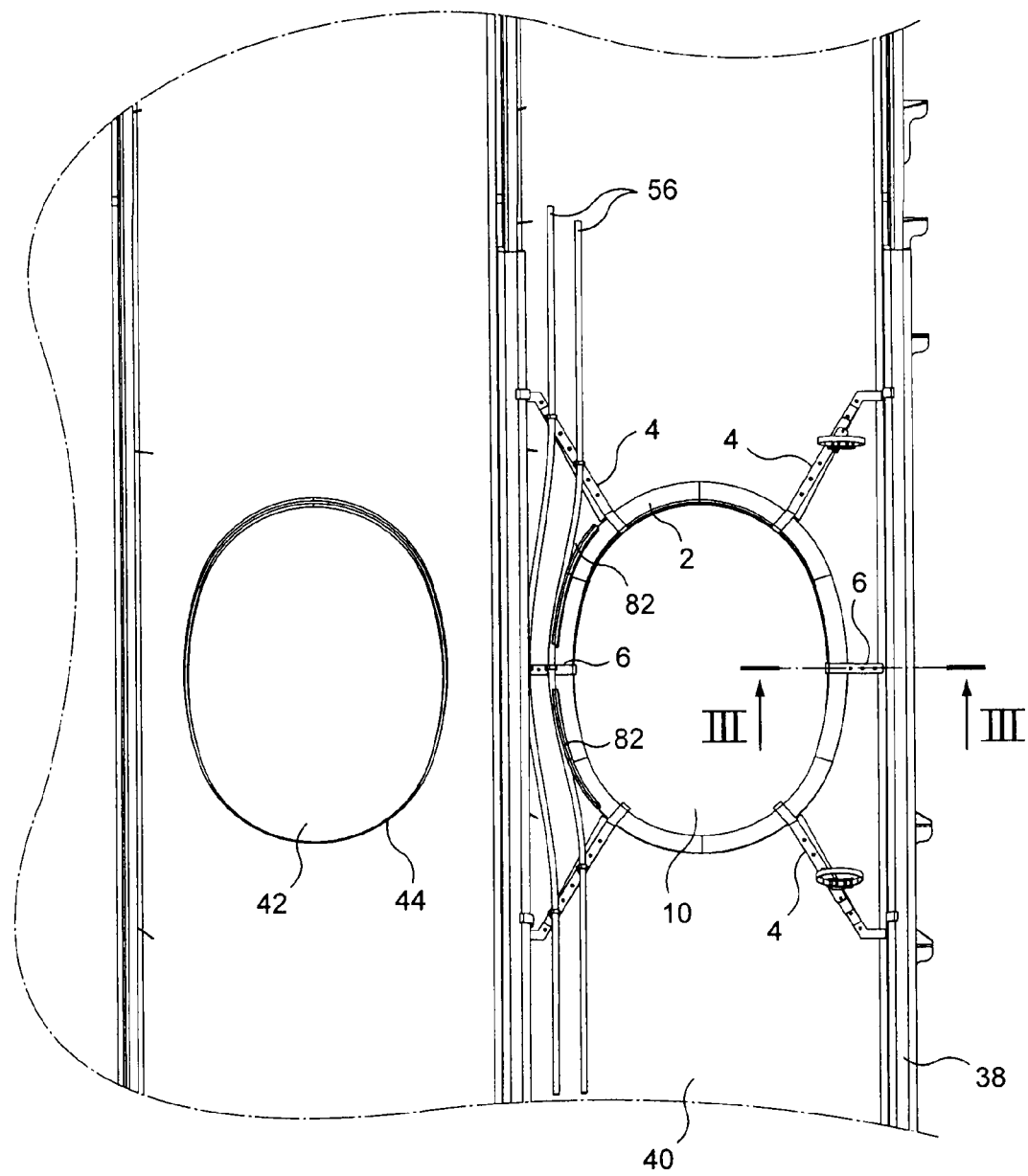

DEVICE FOR FASTENING SYSTEMS FOR AN AIRCRAFT, ADAPTED IN PARTICULAR TO BE USED IN RELATION TO A WINDOW

This invention relates to a device for fastening systems for an aircraft and more particularly for fastening systems on a window.

This invention thus relates to the aeronautical field and more particularly aircraft construction.

An aircraft fuselage usually has a structure made up of frames and stringers. The exterior shell of the fuselage is fastened onto the frames and stringers. When the aircraft is intended to fly at high altitude, considering the outside temperatures to which it is to be subjected, it is necessary to implement a thermal insulation of the fuselage. It then is known to cover the interior face of the skin forming the shell of the fuselage with insulating blankets in the form of flexible strips or panels. These blankets are called field blankets (in English: "field blanket"). It also is advisable to thermally insulate each frame. There then are used blankets having a structure similar to that of the field blankets, but the shape of which is adapted for coming to encase the frames inside the fuselage. These blankets hereinafter are called frame blankets (in English: "frame blanket").

The frames of the fuselage also serve as fastening supports for various systems. By system there is understood here equipment items of the aircraft as well as the electrical wirings, the hydraulic systems, the pneumatic systems, the air ducts for ventilation and pressurization inside the fuselage, . . .

Holes then are made in the frames of the fuselage on the one hand to allow fastening of the insulating blankets and on the other hand to allow supporting and fastening of systems. These holes weaken the frames and sometimes must be compensated for by structural reinforcements, which thus complicates the design of the aircraft.

Moreover, as regards the blankets, it is advisable to adapt their shape to the various fastening devices provided. Holes, cut-outs, notches, grommets, . . . must be provided in the blankets to allow passage of a fastening device, fitting to the structure of the fuselage, . . . . The holes and notches made in the blankets degrade their insulating performance and are sources of thermal (and acoustic) bridges and they thus reduce the performances of the blankets.

It therefore is advisable at the same time to limit the number of holes made in the structure of the aircraft (frame and/or other structural part) as well as in the insulating blankets (field blankets and frame blankets).

The document FR-2 933 376 thus shows, for example, a device for fastening an insulting blanket and a method for installing an insulating blanket in an aircraft fuselage making it possible to limit the number of holes to be made in the frames of the aircraft. The device described in this document comprises a portion forming a hook adapted for coming to cap a flank of the frame and grip the latter by itself or in cooperation with a structural element of the aircraft so as to ensure fastening of the device to the frame. One embodiment of this device comprises a first frame-blanket clip borne by a first member intended to extend on the first side of the frame, a second frame-blanket clip borne by a second member intended to extend on the second side of the frame, a first field-blanket clip borne by the first member and a second field-blanket clip borne by the second member.

This invention then has as a purpose to provide a fastening device allowing on the one hand the fastening of systems and on the other hand the holding of insulating blankets while at the same time limiting the holes to be made in the structure of the aircraft (frame, . . . ) and on the other hand in the said insulating blankets.

Advantageously, the implementation of such a device will be easy and/or at a limited cost price and/or with a mass as small as possible.

For this purpose, this invention proposes a device for fastening systems in an aircraft, characterized in that it comprises, on the one hand, a ring-shaped base the shape of which is adapted to the shape of an aircraft window frame and, on the other hand, arms borne by the ring-shaped base, extending outward from the latter and bearing systems supports.

In this way, by adapting the ring-shaped base to a window frame (in English: "window frame"), the device according to the invention may be mounted on a window which then comes to serve as a structural support for systems supports. The ring-shaped base may come to engage on the window frame and thus avoid any modification of the structure of the aircraft. To adapt to the usual shape of a window frame, this ring-shaped base thus preferably has an overall oval shape, the oval being not in a plane but curved to take into account the curvature of an aircraft cabin wall.

In a first embodiment, a device for fastening systems according to the invention, the ring-shaped base has a sectional form having a section with a first branch extending slightly slanting in relation to an axis of symmetry running inside the ring-shaped base and thus defining a more or less truncated surface, and a second branch extending from the end of the first branch corresponding to the largest circumference of the more or less truncated surface defined by the first branch and forming a flange toward the outside of the ring-shaped base, the first branch and the second branch forming an obtuse angle between them. By virtue of the truncated shape, such an embodiment allows a mounting on a window frame by wedge effect and therefore without having to modify the structure of the window or the aircraft.

In such an embodiment, it may be provided that the arms extend in a plane more or less parallel to the plane of the flange toward the outside of the ring-shaped base.

To make the device for fastening systems according to this invention adjustable, the arms come, for example, to engage in the ring-shaped base with a mortise-and-tenon type system. It then is possible to provide several types of arms, either according to the systems to be supported, or according to the environment, and to choose the correct arm at the time of mounting and installation of the device in an aircraft.

To avoid any risk of accidental dismantling, the arms preferably comprise elastic locking means making it possible to fasten them onto the ring-shaped base. Such means also have the advantage of possibly being able to be dismantled.

To have an adjustable and adaptable device, it may be provided, for example, that each arm comprises bores, and that supports for conduits and/or cables are fastened onto at least one arm, at a bore in each instance. This solution makes it possible to use a very great variety of different supports and furthermore makes it possible to mount them in a great many configurations.

To contribute to holding insulating blankets, called frame blankets, in a device according to this invention it may be contemplated that at least one arm has at its free end a holding tab extending perpendicular in relation to the arm.

An embodiment variant of a device according to this invention provides that the ring-shaped base is made in two parts each having the shape of a half ring, the two parts having a connection and locking system making it possible to connect them, by forming the ring-shaped base.

Finally, this invention also relates to an aircraft, characterized in that it comprises at least one device for fastening systems such as described above.

Figure 2:
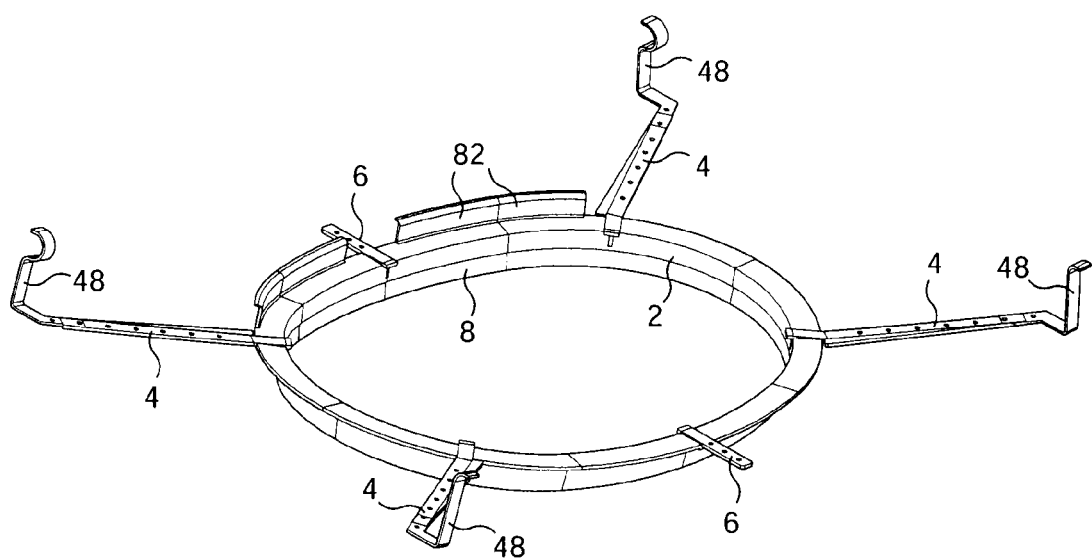
Figure 3:
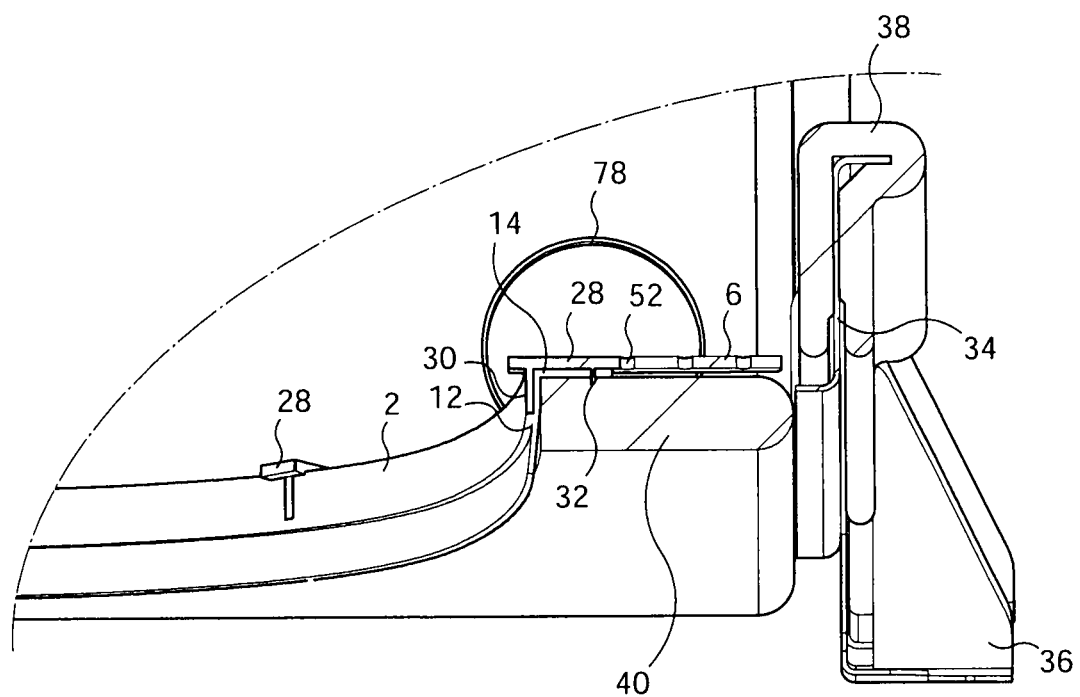
Figure 4:
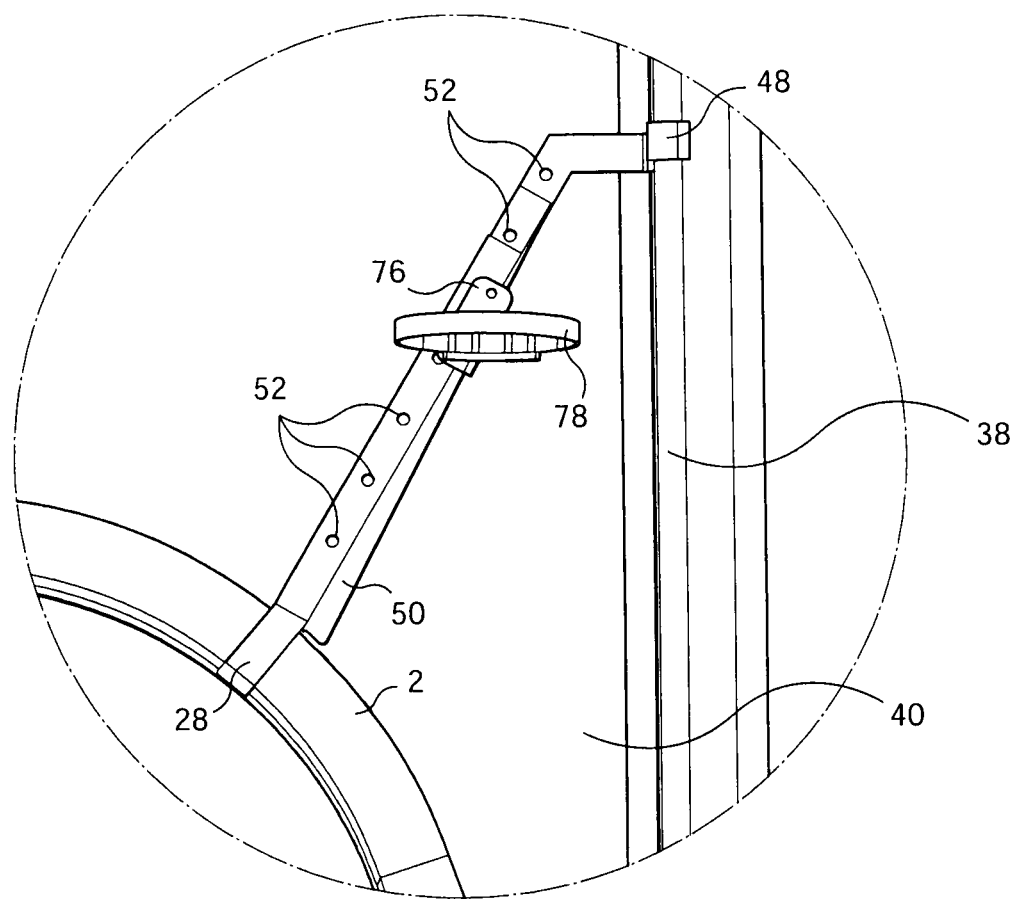
Figure 5:
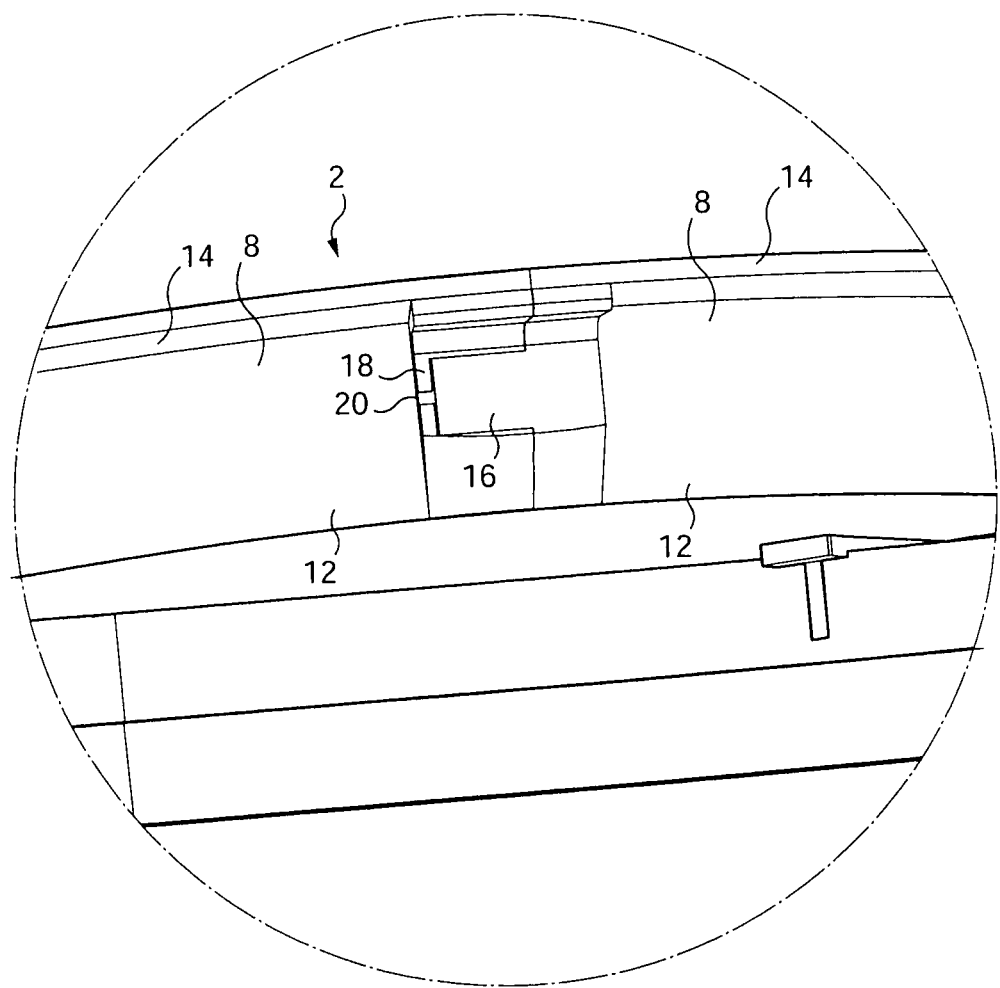
Figure 6:
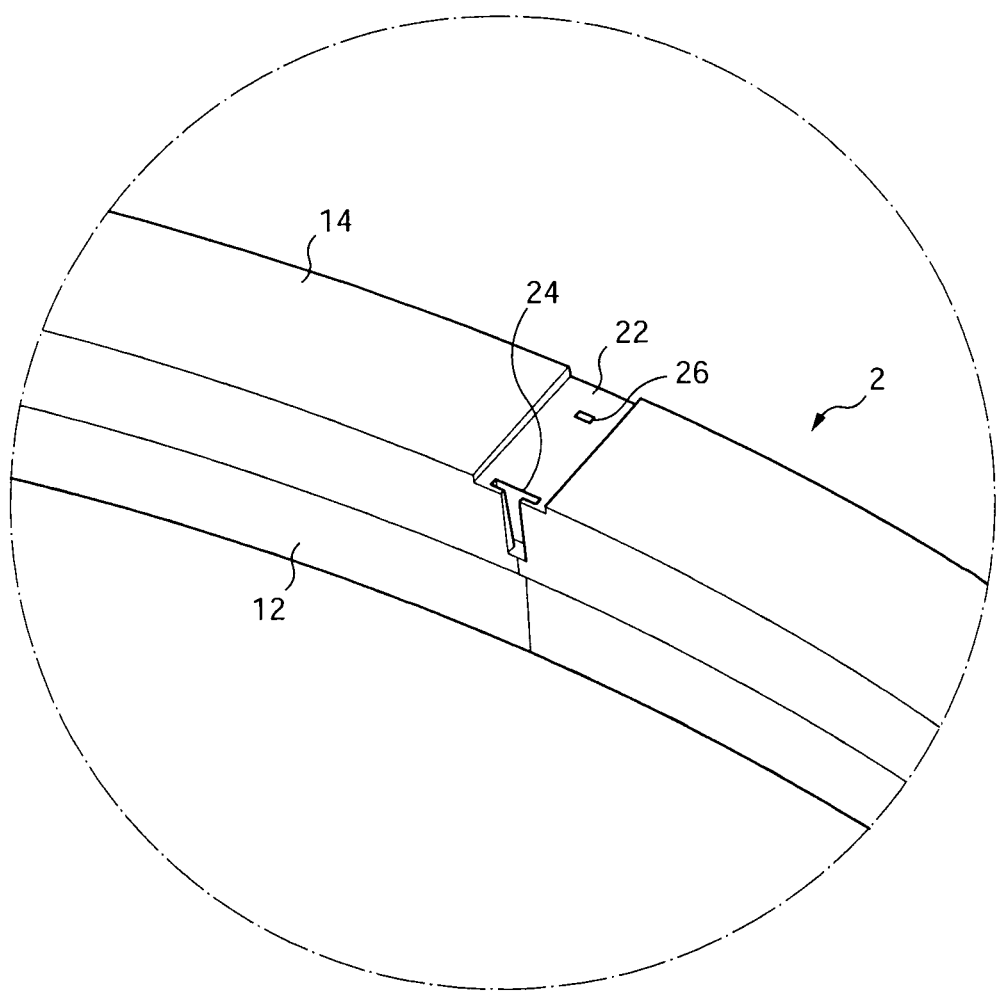
Figure 7:
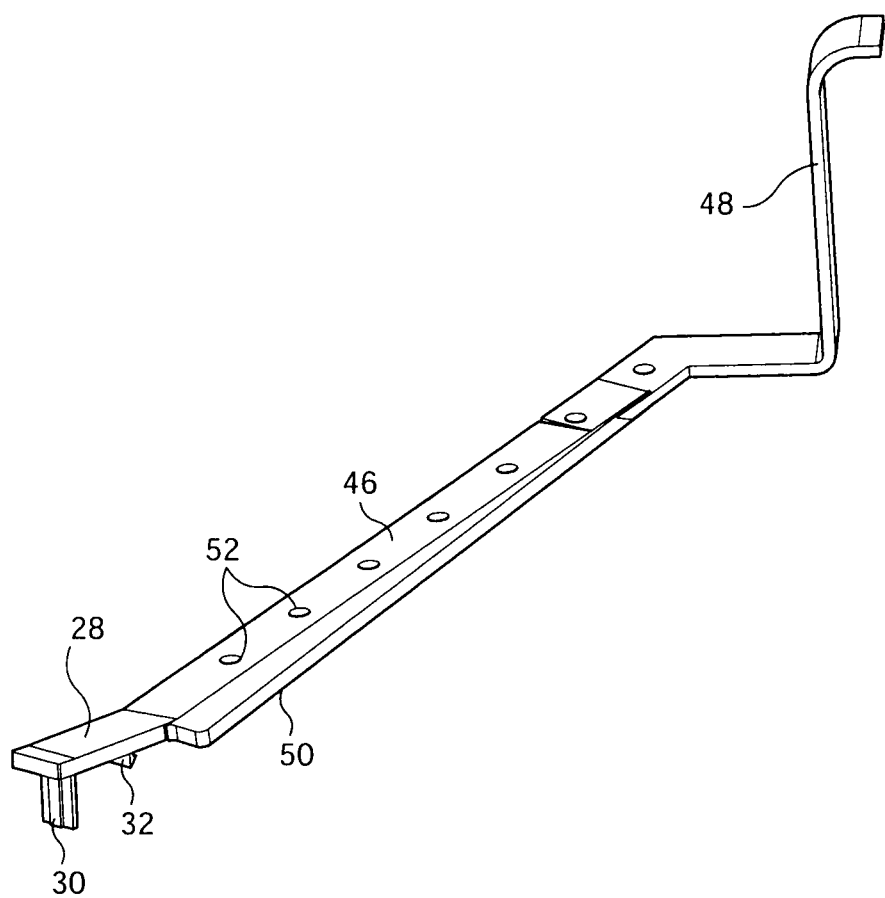
Figure 8:
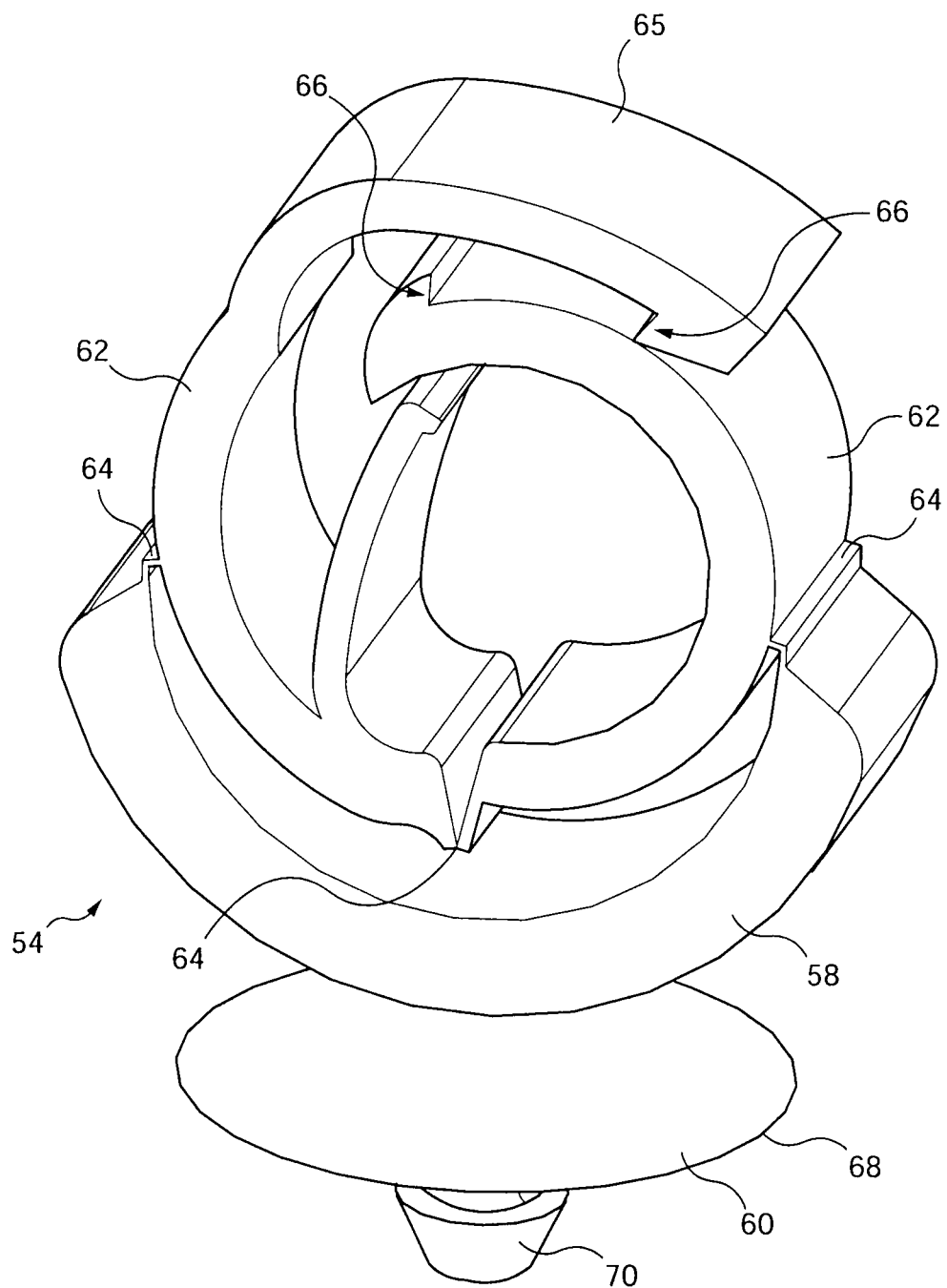
Figure 9:
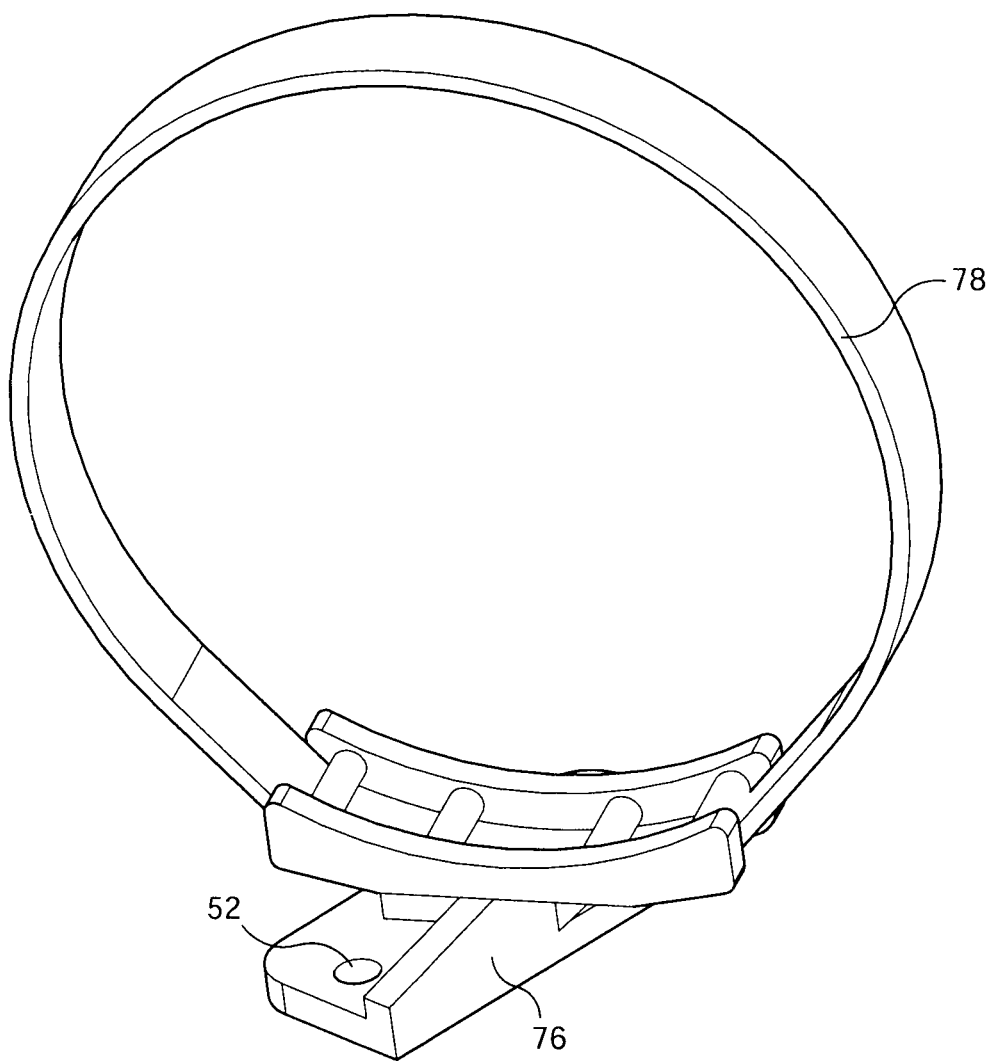

Details and advantages of this invention will become more apparent from the description that follows, presented with reference to the attached schematic drawings on which:

FIG. 1 shows a device according to the invention in its mounted position, around a window of an aircraft, FIG. 2 is a view in perspective of the device according to the invention shown on FIG. 1, FIG. 3 is a cross-sectional view along section line III-III of FIG. 1, FIG. 4 is a detail view of FIG. 1 on an enlarged scale showing an arm of a device according to the invention, FIGS. 5 and 6 are detail views of the device shown in perspective on FIG. 2, FIG. 7 is a view in perspective of an arm of a device according to this invention, and FIGS. 8 and 9 show, by way of examples, in perspective and on an enlarged scale, holding devices that may be used in a device according to this invention.

The device shown on FIGS. 1 and 2 comprises a ring-shaped base 2 from which arms 4, 6 extend.

Ring-shaped base 2 is made up of two parts 8 that are assembled with one another to form whole ring-shaped base 2. The shape of ring-shaped base 2 is adapted to the shape of a window 10 on which it is intended to be mounted. In the example shown on the drawings, base 2 thus has a general overall oval shape. Moreover, base 2 also is curved to adapt to the likewise curved shape of window 10. The curvature, however, is relatively slight (significant radius of curvature) and therefore in first approximation it could be considered that base 2 is plane.

Ring-shaped base 2 has a cross section with two branches forming an obtuse angle, for example ranging between 92° and 105° between them.

A first branch 12 of the cross section of base 2 is slightly slanting in relation to an axis perpendicular to the plane of FIG. 1. This axis may be defined, for example, as being an axis of symmetry for ring-shaped base 2, running to the center of the ring defined by base 2. When the device is mounted on window 10, the axis considered is perpendicular to the said window. In that way, first branch 12 of the base defines a more or less truncated surface, which therefore has a small circumference and a large circumference.

A second branch 14 of the cross section of base 2 extends from the large circumference defined in the preceding paragraph toward the outside of base 2. This second branch 14 thus defines a flange which is, close to the curve, more or less perpendicular to the axis of symmetry also defined in the preceding paragraph.

As indicated above, ring-shaped base 2 is made in two parts 8 that are assembled with one another as illustrated on FIG. 5. At the joining between the two parts 8, a first part 8 bears at the outer periphery of the more or less truncated zone of base 2, beneath the flange formed by second branch 14, a tongue piece 16 that comes to cooperate with a groove 18 formed in the other part 8 of base 2. For example, clipping means allowing tongue piece 16 to come to be clipped in groove 18 may be provided. There is seen on FIG. 5 the presence of a notch 20 that allows insertion of the end of a screwdriver beneath tongue piece 16 so as to enable "unclipping" of the latter.

It may be provided, for example, that one end of one part 8 of base 2 bears a tongue piece 16 and that the other end thereof bears a groove 18. The two parts 8 then forming ring-shaped base 2 may be identical.

As may be seen on FIG. 2, the flange formed by second branch 14 bears arms 4, 6. FIG. 6 illustrates the means on ring-shaped base 2 making it possible to accommodate an arm 4, 6. A rectangular housing 22 extending over the flange formed by second branch 14 extends radially in relation to ring-shaped base 2. This rectangular housing 22 extends over the entire width of this flange. On the interior side of ring-shaped base 2, a T-shaped groove 24 is made in the more or less truncated part of ring-shaped base 2. There also is seen at rectangular housing 22 the presence of an aperture 26 that completely traverses the flange formed by second branch 14 of ring-shaped base 2.

FIG. 7 illustrates an arm 4. At one of these ends, this arm 4 bears means allowing fastening thereof onto ring-shaped base 2. These fastening means are identical to the means for fastening an arm 6 onto ring-shaped base 2.

The means for fastening arms 4 and 6 comprise a tab 28 of rectangular shape, the dimensions of which correspond to those of rectangular housings 22 implemented on ring-shaped base 2. One face of this tab 28, called lower face, bears on the one hand a sectional dog 30 and on the other hand a clipping dog 32. Sectional dog 30 extends more or less perpendicular to tab 28. It has a T-shaped section the shape and dimensions of which are adapted to T-shaped groove 24 made in ring-shaped base 2.

Clipping dog 32 has the shape of a harpoon and is intended to cooperate with an aperture 26 made in the flange defined by second branch 14 of ring-shaped base 2. FIGS. 1, 2 and 4 show how an arm 4 and/or 6 is mounted on ring-shaped base 2. To reach this mounted position, sectional dog 30 is inserted into corresponding T-shaped groove 24. In that way, a guidance of corresponding tab 28 and therefore also of corresponding arm 4 or 6 is achieved for mounting the arm on ring-shaped base 2. In the process of mounting, clipping dog 32 comes to be inserted into corresponding aperture 26. Clipping dog 32 is dimensioned so that during its insertion into aperture 26, the free end of the harpoon is elastically deformed to draw closer to the base of the harpoon. Moreover, when tab 28 is in its final position in rectangular housing 22, the free end of the harpoon of clipping dog 32 has fully traversed aperture 26 and comes to ensure holding of arm 4 or 6.

FIG. 1 shows a portion of a fuselage of an aircraft. This fuselage comprises frames 34 (cf. FIG. 3) which extend crosswise in relation to the fuselage of the aircraft. An outer skin is fastened to frame 34 by connecting pieces 36 also visible on FIG. 3. The fuselage portion shown is covered by insulating blankets. Two different types of blankets are used here: frame blankets 38 (in English: "frame blanket") and field blankets 40 (in English: "field blanket"). Field blankets 40 cover the outer skin of the fuselage while frame blankets 38 come to cover frames 34. The fuselage portion shown on FIG. 1 also comprises two windows 10.

The device for fastening systems shown on FIG. 2 is intended to come to be positioned on a window 10 as illustrated on FIG. 1.

Window 10 comprises, in standard manner, a pane of glass 42 mounted in a window frame 44. The shape and dimensions of ring-shaped base 2 are adapted to allow mounting of this base 2 on window frame 44 of the window. By virtue of the truncated part of ring-shaped base 2, base 2, during mounting thereof on window frame 44, comes to be fastened onto the latter by wedge effect. Here, the conicity of the truncated part of ring-shaped base 2 is adapted to the conicity of window frame 44 to allow an excellent fastening of base 2. Considering the oval shape of this base, good positioning of ring-shaped base 2 in relation to window 10 is obtained automatically.

When ring-shaped base 2 is positioned in this way on window 10, arms 4, 6 extend more or less radially from this base 2 toward the outside thereof. In each instance, arms 4, 6 extend more or less as far as the vicinity of a frame 34. As clearly emerges from FIG. 1, two arms are relatively short. These arms subsequently will bear the reference 6. The other arms are longer and bear the reference 4.

FIG. 3 is a cross-sectional view along section line III-III of FIG. 1 and shows how an arm 6 is mounted on ring-shaped base 2 and also shows how this arm 6 contributes to holding corresponding field blanket 40.

As may be seen on FIG. 3, between window 10 and frame 34, field blanket 40 is held on the one hand by ring-shaped base 2 and on the other hand by an arm 6 extending from this ring-shaped base 2 toward a frame 34. As described above, arm 6 has at one of its ends a tab 28 that cooperates with ring-shaped base 2 through a sectional dog 30 and a clipping dog 32. The mounting of ring-shaped base 2 described above is accomplished while field blanket 40 already is positioned. The flange corresponding to second branch 14 of ring-shaped base 2 then comes to cover an edge of field blanket 40 corresponding to the cut-out made in this blanket at corresponding window 10. By virtue of its presence, arm 6 prevents field blanket 40 from moving away from the outer skin of the fuselage. To avoid a sliding of field blanket 40 in relation to the outer skin, it may be provided to have a hook-and-loop type attachment system between field blanket 40 and arm 6. Such a hook-and-loop fastening system is better known under the trade name Velcro.

Arms 4 also extend from the flange of ring-shaped base 2 toward a frame 34. While arms 6 extend more or less perpendicular to corresponding frame 34, arms 4 are slanting in relation to frame 34. As a result of this slant, and the starting point of arm 4 on the flange of ring-shaped base 2, arm 4 is longer than arm 6 described above. Just as for arms 6, each arm 4 has at one of its ends, on the ring-shaped base 2 side, a tab 28 equipped with a sectional dog 30 and a clipping dog 32 allowing its fastening onto ring-shaped base 2. Each arm 4 also has a body 46 of overall elongated parallelepipedal shape. Arms 6 have a similar body 46 but of lesser length.

In comparison with arms 6, arms 4 bear at their end opposite tab 28 a holding tab 48. The latter comes to contribute holding frame blanket 38 on corresponding frame 34. Holding tab 48 extends more or less perpendicular to body 46 of arm 4. This enables it to hold frame blanket 38 against corresponding frame 34. It is seen that there are two distinct shapes of holding tabs 48. In fact, to adapt to the shape of frame 34, the shape of holding tabs 48 is adapted according to the fact that it is intended to come on one or the other side of frame 34.

In this way, arms 4 therefore contribute to holding frame blankets 38. Arms 4 contribute in the same way as arms 6 also to holding field blankets 40. In fact, body 46 of an arm 4 makes it possible, just like body 46 of an arm 6, to hold field blanket 40 against the outer skin of the fuselage.

To prevent sliding of field blanket 40 in relation to the outer skin, along the latter, a fastener 50 also is provided. This fastener 50 extends over all or part of the length of body 46 of arm 4. This fastener 50 forms part of a hook-and-loop fastening system better known under the trade name Velcro. The other part of the fastening system is made integral with field blanket 40.

As may be seen on the Figures, evenly spaced bores 52 are implemented on body 46 of arms 4 and 6. These bores 52 are provided in order to enable fastening of supports, such as the supports shown in greater detail on FIGS. 8 and 9.

FIG. 8 shows a support 54 intended to accommodate an electrical cable 56 (FIG. 1). Such a support 54 comprises a base 58 topping a foot 60 and itself bearing two jaws 62.

Base 58 has the shape of a curved band. Each of its two ends forms a hinge 64 onto which a jaw 62 is jointed so as to be able to pivot in relation to base 58. Each of jaws 62 also has the overall shape of a curved band. The two jaws 62 are connected with one another by a third hinge 64.

Support 54 is shown on FIG. 8 in closed position. In open position, jaws 62 are pivoted approximately 90° outward in relation to the position shown on this FIG. 8 and thus form a W. When an electrical cable 56 comes to rest at the center of this W, jaws 62 again close to come into the position shown on FIG. 8 and grip corresponding electrical cable 56. It may be seen that by virtue of the presence of an outer tongue piece 65 and a set of hooks 66, support 54 is locked in closed position, preventing any unintentional displacement of electrical cable 56 out of the housing provided in support 54.

Foot 60 of support 54 comprises a circular support plate 68 from which there extends, on the side opposite base 58, a rod having a truncated head 70. The latter is made of an elastic material such as rubber or a similar synthetic material and is such that its vertex forms a circle with diameter smaller than the diameter of bores 52 and that its base forms a circle with diameter larger than the diameter of bores 52. In that way, truncated head 70 may be inserted through a bore 52, but once the base of this head has gone through the said bore, it becomes difficult to withdraw it in the other direction, the periphery of the base of the truncated head coming to rest flat around corresponding bore 52.

As to FIG. 9, it shows a support 74 intended to accommodate an air duct (or any type of conduit intended for circulation of a fluid). Such a support 74 comprises a support plate 76 topped by a collar 78.

Support plate 76 is a support plate of more or less rectangular shape. It has two bores 52 which are similar to bores 52 implemented in bodies 46 of arms 4 and 6. The spacing between the two bores 52 and support plate 76 corresponds to the spacing (which preferably is constant) between two adjoining bores 52 implemented in a body 46 of an arm 4 or an arm 6. By virtue of these bores 52, support plate 76 may be fastened onto an arm 4 (possibly an arm 6: as arms 6 are of shorter length, they are used instead to support electrical cables which are less bulky as compared with air or similar ducts). Fastening of support plate 76, and therefore of support 74, may be accomplished for example with the aid of square-head fasteners (not shown), also called by their designation in English, that is to say "tie wrap." Other fastening means also may be considered here, for example a pin going into each of bores 52 of support plate 76 and into a bore 52 of corresponding arm 4 (or 6).

Collar 78 is a collar adapted to the size of the ducts to be supported. Any type of collar generally used, for example in aeronautics, for holding air ducts may be used here. Such collars are known to the individual skilled in the art and will not be described in detail here.

Supports 54 and 74 are used for supporting electrical cables and air ducts. These cables and ducts generally extend along frames 34, or more or less in the same direction as frames 34. On FIG. 1, only two electrical cables 56 have been shown. These cables are relatively flexible and therefore may be easily diverted. In this way, near window 10, electrical cables 56 may be brought closer to each other in order to adapt to the narrower passage at window 10 between the latter and frames 34.

In order to prevent electrical cables 56 passing close to window 10 from coming to pass in front of window 10, deflectors 82 may be provided. The latter may be integrated into ring-shaped base 2 or else come to engage on ring-shaped base 2 when electrical cables 56 are diverted nearby.

The device described above makes it possible to use the frame of a window as a structural support for installation of systems, and more particularly for support of electrical cables and air ducts. As described above, this device also makes it possible to contribute to holding insulating blankets, frame blankets and field blankets. The window frame thus has functionalities that it did not offer in the state of the art prior to this invention.

If the support and holding device described above comes to be dismantled, it is possible to remount it exactly in the same configuration as prior to dismantling thereof. In this way, in the case of a servicing operation on an aircraft, it is possible to guarantee that the systems will be remounted so as to again be in the same position as prior to dismantling thereof.

The device according to the invention, particularly such as described above, allows a considerable adjustability and a good adaptability. In fact, it makes it possible on the one hand to adapt to a great many solutions for the passing through of supported systems and on the other hand it makes it possible to support all types of systems because it suffices to adapt the supports fastened onto the arms of the device in order to be able to accommodate another system.

The device according to the invention also has the great advantage of being able to provide supporting of cables and ducts without having to make holes in or modify the structure of the aircraft. Likewise, the holding of insulating blankets does not require adaptation of same; no cut-out, notch or grommet placement has to be implemented here.

Mounting of this device according to the invention also may be accomplished without a tool, or at least without a specific tool. Moreover, a single operator can perform the mounting of a device according to the invention on an aircraft window. As regards dismantling thereof, this itself also may be easily accomplished.

Finally, this invention is easy and quick to implement. Mounting time is limited. In addition, if the device according to the invention is made of synthetic material, it is possible to have a device with reduced weight, which of course is advantageous for an aircraft.

This invention is not limited to the preferred embodiment shown on the drawings and described above. It also relates to all the embodiment variants indicated and those within the capacity of the individual skilled in the art in the context of the claims below.

Thus, for example, the device described and shown comprises six arms around a ring-shaped base. The number of arms, their method of fastening onto the base, their shape, that of the base, could be modified without, for all that, departing from the context of the invention.

Likewise, it may be contemplated that a device according to the invention serves only for systems support, without contributing to holding insulating blankets.

The types of supports used for electrical cables and for air ducts have been provided by way of non-limitative examples. Other supports, possibly adapted to other types of ducts, could be used in a device according to this invention.

The invention claimed is:

1. A structure for fastening one or more system supports in an aircraft, the structure comprising:
a ring-shaped base adapted to be mounted around a window of the aircraft;
a plurality of arms engaged with and connected to the ring-shaped base, each of the plurality of arms extending outward from the ring-shaped base substantially perpendicular to an axis of symmetry of the ring-shaped base, wherein the axis of symmetry extends through a center of the ring-shaped base and perpendicular to a plane formed by the ring-shaped base,
wherein each of the plurality of arms includes a first portion for engaging with and connecting to the ring-shaped base, and a second portion not directly engaged with or connected to the ring-shaped base and configured to bear the system supports, the second portion extending outward from the ring-shaped base substantially perpendicular to an axis of symmetry of the ring-shaped base,
wherein the window includes a frame which forms structural support for the ring-shaped base, and
wherein said ring-shaped base has an annular shape suitable for mounting the ring-shaped base around a circumference of the frame of the window.

2. The structure for an aircraft according to claim 1, wherein the ring-shaped base has a sectional form and includes:
a section with a first branch extending slightly slanting in relation to an axis of symmetry of the ring-shaped base and in this way defining a truncated surface, and
a second branch extending from an end of the first branch corresponding to a larger circumference of the truncated surface defined by the first branch and forming a flange toward an outside of ring-shaped base,
wherein the first branch and the second branch forming an obtuse angle between them.

3. The structure for an aircraft according to claim 2, wherein the plurality of arms extend in a plane substantially parallel to the plane of the flange toward the outside of the ring-shaped base.

4. The structure for an aircraft according to one of claims 1 to 3, wherein the plurality of arms engage in the ring-shaped base by means of a mortise-and-tenon type system.

5. The structure for an aircraft according to one of claims 1 to 3, wherein the plurality of arms include elastic locking means that fasten the arms onto the ring-shaped base.

6. The structure for an aircraft according to one of claims 1 to 3, wherein each arm includes bores, and
wherein supports for at least one of ducts and cables are fastened onto at least one arm at a bore in each instance.

7. The structure for an aircraft according to one of claims 1 to 3, wherein at least one arm has at its free end a holding tab extending perpendicular in relation to the arm.

8. A structure for an aircraft according to claim 1 wherein the ring-shaped base is made in two parts each having the shape of a half ring, the two parts having a connection and locking system making it possible to connect them by forming the ring-shaped base.

9. An aircraft comprising:
a structure according to any one of claims 1 to 3.

10. A structure for an aircraft according to claim 1, wherein the second portion that extends outward from the ring-shaped base substantially perpendicular to an axis of symmetry of the ring-shaped base, extends radially outward beyond an outer edge of the window of the aircraft.

* * * * *